United States Patent Office 2,943,501
Patented July 5, 1960

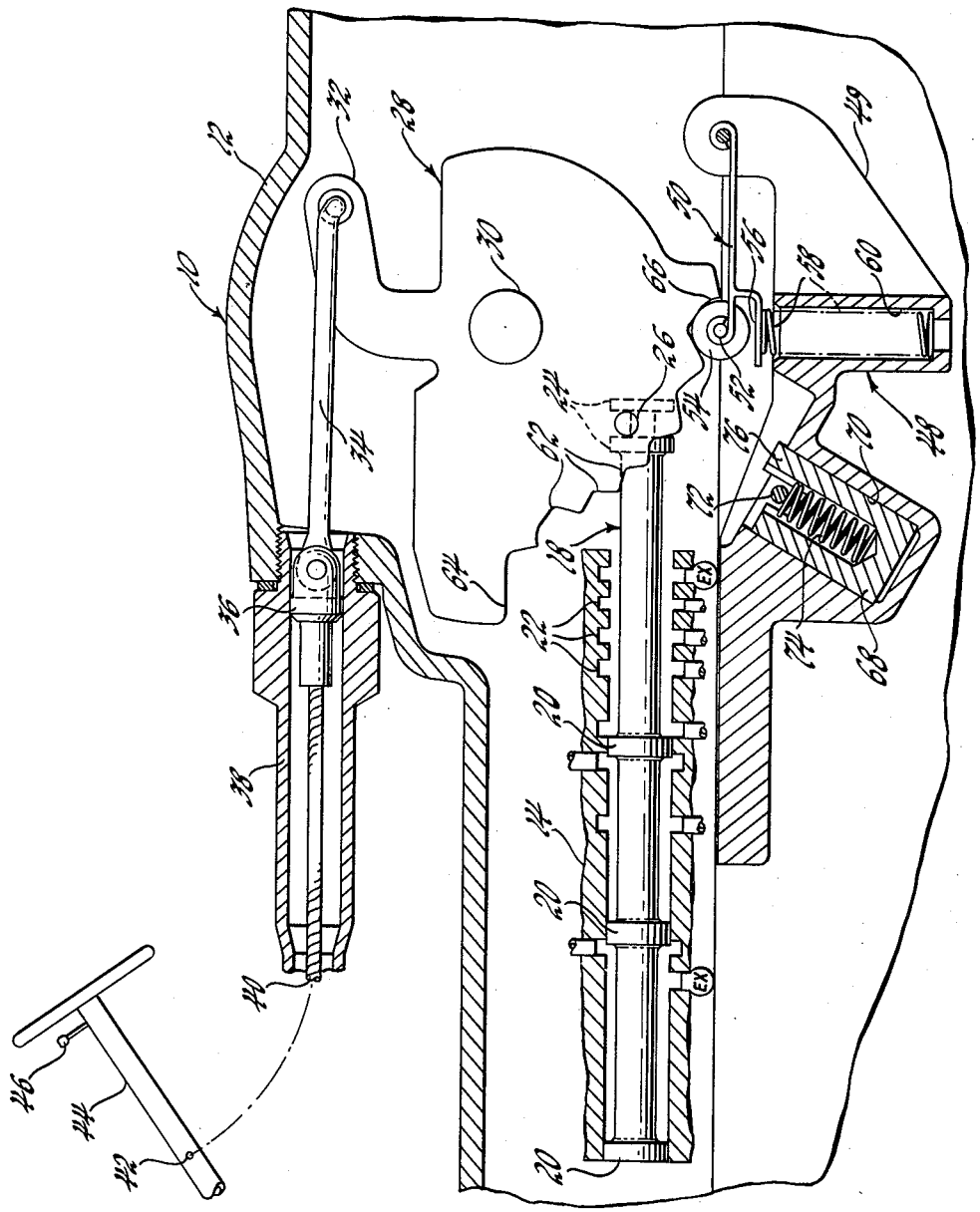

2,943,501

TRANSMISSION CONTROL

Robert W. Stapleton, Ann Arbor, Mich., assignor to General Motors Corporation, Detroit, Mich., a corporation of Delaware Filed Oct. 10, 1957, Ser. No. 689,321

2 Claims. (Cl. 74—335)

This invention relates to improvements in transmission controls and particularly to those controls of the selectively positionable character.

In transmission controls of the type utilizing a transmission selector, which is positionable in a plurality of transmission settings, such as forward, reverse and neutral, the selector settings are usually releasably maintained through an appropriate detent mechanism. By employing what are often complex linkages in conjunction with a selector lever, sufficient leverage can be afforded the driver so that the resistance from the detent mechanism is insignificant. However, where these expensive linkages are replaced by a cable and then combined with low torque selectors, e.g. dials or buttons, the resistance of the detent mechanism becomes a problem.

Therefore, the invention contemplates a transmission control of the foregoing character that is easily maneuvered against a minimum resistance, that is simplified structurally and is simple in operation without requiring close manufacturing tolerances.

By the invention, a transmission selector is releasably retained in a chosen transmission setting by a novel detent mechanism without interfering with easy movement of the transmission selector to different settings.

Specifically, the invention affords a detent mechanism that releasably holds a transmission selector in a particular setting and that due to a unique rolling action resists with a minimum force repositioning of the selector lever.

In carrying out the invention, a sector plate having along one edge thereof a series of notches corresponding to the various transmission settings is interposed between a conventional manual valve for the transmission and a cable, in turn, connected to a transmission selector. A detent mechanism, utilizing a pivotally mounted carrier to an end of which is journalled a roller, is afforded for releasably engaging the notches in the sector plate. With this arrangement, the driver senses each transmission setting due to the detent resistance, but, because of the rolling action, the resistance needed for repositioning the selector is a minimum.

The foregoing and other objects and advantages of the invention will be apparent from the following description and from the accompanying drawing which shows a partial sectional view of a transmission embodying the principles of the invention.

In the drawing, the numeral 10 designates generally a transmission including a casing 12 within which is housed and attached thereto a valve body 14. A manual valve, indicated at 18, is slidable within a bore in the valve body 14 and comprises a series of spaced lands 20 which control fluid communication between the several ports 22 in a manner well known. By positioning the manual valve 18 in various transmission settings, the transmission can be conditioned accordingly, e.g., to establish neutral, reverse and forward drive.

At the terminal end of the manual valve 18, a pair of spaced flanges 24 thereon are arranged to receive a pin 26 secured to a sector plate, shown generally at 28. The plate 28 is rotatably mounted on a shaft 30 supported by the casing 12 so as to slide, through the pin 26 and flanges 24, the manual valve 18 back and forth in the bore and align the ports corresponding to the selected setting.

An arm 32 extending from the sector plate 28 is connected to one end of a rod 34 at a distance from the rotational axis of the sector plate 28 selected to afford the maximum leverage for the space allotted while the opposite end of the rod 34 is pivotally connected to a cable connector 36. The cable connector 36 is slidably housed within a guide end of a cable sheath 38 threadably attached to the casing 12. A cable 40 is enclosed by the sheath 38 and has one end attached to the connector 36. The cable 40 extends through an opening 42 in a steering column 44 and is appropriately secured to a transmission selector, such as shift lever 46. Actuation of the transmission shift lever 46 will, through the cable 40 and rod 34, rotate the sector plate 28 and, accordingly, position the manual valve 18 in one of the series of transmission settings provided. If desired the shift lever 46 may be replaced by a dial or button type actuator.

To maintain the manual valve 18 and the sector plate 28 releasably in any one of the desired transmission settings, a detent mechanism, depicted generally at 48, is furnished comprising a support bracket 49 on which is pivotally mounted a carrier 50. An end 52 of the carrier 50 is bifurcated to embrace and rotatably support a roller 54. Depending from the carrier 50 is an arm 56 which engages a spring 58 housed within a bore 60 in the bracket 49. The spring 58 through the arm 56 exerts an upward bias on the carrier 50 and, consequently, urges the roller 54 into constant engagement with one of a series of notches 62 along the edge of the sector plate 28. Each of the notches corresponds to a particular transmission setting of the manual valve 18.

At each end of the row of notches 62, projections 64 and 66 are provided to limit the extent of rotational movement of the sector plate 28. When an attempt is made to rotate the sector plate 28 beyond these limits the carrier arm 56 will strike the bracket 49 near the top of the bore 60 and together with the projections 64 and 66 will block further movement.

The projection 64 has another function, namely, to insure that the sector plate 28 is not inadvertently rotated to the reverse setting when the vehicle is proceeding in forward drive. To prevent this, a hollow blocker piston 68 is afforded which is slidably positioned in a bore 70 in the bracket 49. A cross pin 72 limits outward movement of the piston 68 and provides a stop for a spring 74 located inside the hollow piston 68. Consequently, the spring 74 urges the blocker piston 68 to the position shown until some suitable agency, e.g., pressure fluid corresponding to predetermined vehicle speed forces the piston 68 outwardly. Then an extension 76 on the piston 68 will engage the projection 64 and prevent further counterclockwise rotation of the sector plate 28.

As can be seen, the multiple links and levers commonly employed for rotating the sector plate 28 have been replaced by the cable 40, hence, reducing the cost as well as eliminatating the many inaccuracies resulting from the accumulation of permissive manufacturing tolerances. Because the arrangement is limited as to the amount of leverage that can be obtained, the relatively frictionless detent mechanism 48, due to the rolling action, presents only slight resistance to rotation of the sector plate 28 from one transmission setting to another while still providing sufficient force to maintain the sector plate 28 in the desired setting so that the driver senses each setting as he positions the lever 46.

The invention is to be limited only by the following claims.

I claim:

1. In a transmission shifter control; the combination of a manually operable selector member positionable in a series of settings corresponding to different transmission operating statuses; a transmission control member for causing the transmission to be conditioned for each transmission status; a rotatable sector element joined to the transmission control member; the rotatable sector element including a control surface provided with a series of notches corresponding to each of the transmission settings and a projection at the end of the control surface and adjacent one of the notches; a cable interconnecting the sector element and the selector member; and a detent mechanism for releasably holding the sector element in a selected setting, the detent mechanism including a support bracket, a carrier mounted on the bracket for pivotal movement in a plane substantially parallel to the plane of rotation of the sector element, the carrier including spaced substantially parallel bifurcated and stop arms, a roller having reduced diameter ends adapted to be revolvably supported at the reduced diameter ends by the bifurcated arm, and a compression spring supported by the bracket and so positioned as to engage the stop arm and urge the roller into engagement with the selected notch, the carrier being so positioned relative to the bracket that the stop arm is forced into engagement with the bracket when the sector element is revolved far enough to cause the projection to engage the roller thereby preventing further rotatable movement of the sector element.

2. In a transmission shifter control; the combination of a manually operable selector member positionable in a series of settings corresponding to different transmission operating statuses; a transmission manual valve for causing the transmission to be conditioned for each transmission status; a rotatable sector element joined to the transmission manual valve; the rotatable sector element including a control surface provided with a series of notches corresponding to each of the transmission settings and projections at the end of the control surface; a cable interconnecting the sector element and the selector member; a detent mechanism for releasably holding the sector element in a selected setting, the detent mechanism including a support bracket having a bore therein and a stop surface adjacent the bore, a carrier pivotally mounted on the bracket for pivotal movement in the plane of rotation for the sector element, the carrier including spaced substantially parallel bifurcated and stop arms, a roller having reduced diameter ends adapted to be revolvably supported at the reduced diameter ends by the bifurcated arm, and a compression spring housed within the bore and so positioned as to engage the stop arm and urge the roller into engagement with the selected notch, the carrier being so positioned relative to the bracket that the stop arm engages the stop surface when the sector element is revolved far enough to cause one of the projections to engage the roller thereby preventing further rotatable movement of the sector element; and a plunger supported by the bracket for movement to an operative position in which the plunger engages one of the projections so as to prevent rotation of the sector element to one of the transmission settings.

References Cited in the file of this patent

UNITED STATES PATENTS

| | | |
|---|---|---|
| 1,249,755 | Holmgren | Dec. 11, 1917 |
| 1,612,616 | Creighton | Dec. 28, 1926 |
| 1,938,796 | Bernard | Dec. 12, 1933 |
| 2,088,184 | White | July 27, 1937 |
| 2,355,457 | Mares | Aug. 8, 1944 |
| 2,629,265 | Dodge | Feb. 24, 1953 |
| 2,737,824 | Livermore | Mar. 13, 1956 |
| 2,792,716 | Christenson | May 21, 1957 |

FOREIGN PATENTS

| | | |
|---|---|---|
| 204,122 | Canada | 1920 |